S. DEUTSCH.
CENTRIFUGAL CLUTCH.
APPLICATION FILED JUNE 16, 1913.

1,108,345.

Patented Aug. 25, 1914.

WITNESSES:
Hugo W. Kreinbring
Mary A. Hawthorne

INVENTOR
Simon Deutsch.
BY
Edward N. Pagelsen.
ATTORNEY

UNITED STATES PATENT OFFICE.

SIMON DEUTSCH, OF DETROIT, MICHIGAN.

CENTRIFUGAL CLUTCH.

1,108,345.     Specification of Letters Patent.     Patented Aug. 25, 1914.

Application filed June 16, 1913.   Serial No. 773,922.

*To all whom it may concern:*

Be it known that I, SIMON DEUTSCH, a citizen of the United States, and a resident of Detroit, in the county of Wayne and State of Michigan, have invented a new and Improved Centrifugal Clutch, of which the following is a specification.

This invention relates to means adapted to connect the starting devices of internal combustion engines for automobiles and launches to the crank-shafts, and its object is to provide a clutch which will disconnect the starting device from the crank-shaft when the engine has attained a predetermined speed under its own power and remain disconnected should the crank-shaft suddenly reverse through "back-fire" or rocking under compression.

This invention consists in combination with an exterior driving member comprising a revoluble ring adapted to receive power from the starting device and having internal teeth, an interior driven member in the form of a spider secured to the crank-shaft of the engine, and comprising a series of arms on which are mounted a plurality of counter-weighted pawls adapted to swing into engagement with the internal teeth of the exterior driving member when the same is revolving and thereby revolve the interior driven member and the shaft upon which the driven member is mounted, and a series of pivotally mounted dogs adapted to engage the pawls in order to hold them out of engagement with the exterior driving member during the interval in which the engine reverses by reason of "back-fire" or rocking under compression.

Figure 1:
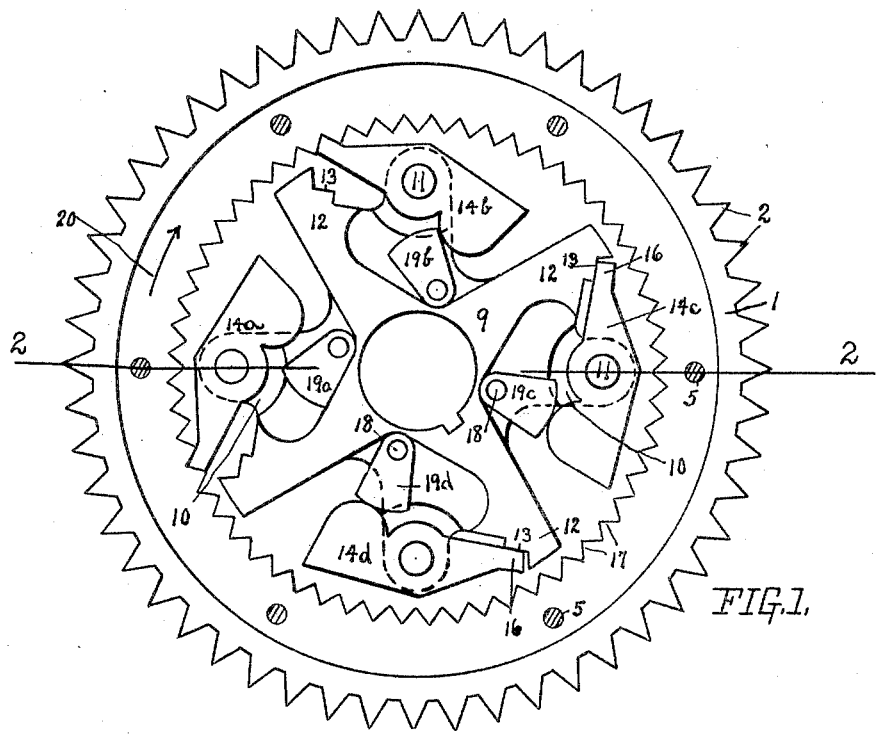
Figure 2:
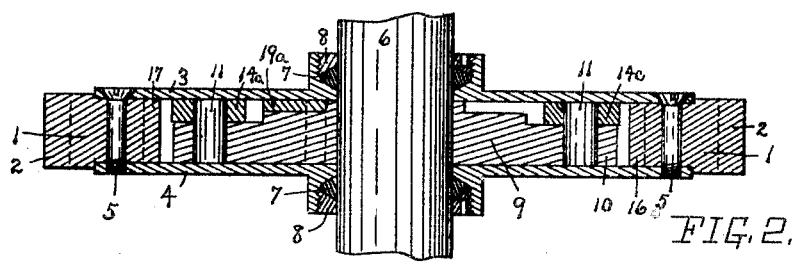
Figure 3:
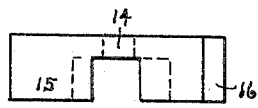
Figure 4:
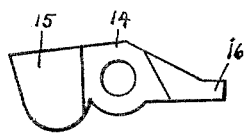

In the accompanying drawings Figure 1 is an elevation of this clutch with one of the cover plates removed to show the interior. Fig. 2 is a section on the line 2—2 of Fig. 1. Figs 3 and 4 are elevation and bottom views respectively of one of the pawls.

Similar reference characters refer to like parts throughout the several views.

The driving member of this clutch consists of a ring 1 having a series of teeth 2 of any desired form, to which a motor or belt may connect, the teeth shown being adapted to receive a noiseless link belt of well known construction. The sides of this ring are recessed to receive the outer edges of the disks 3 and 4, held in position by screws 5. These disks are bored to receive the shaft 6 and have packing rings 7 held in position by the glands 8. By these means the oil within the clutch is prevented from escaping along the shaft. The interior driven member consists of a spider 9 having arms 10 which carry the pins 11, and arms 12 which have seats 13. Pawls $14^a$ $14^b$, $14^c$ and $14^d$, having counterweighted ends 15 and engaging members 16, are mounted on these pins 11 and are adapted to engage the interior teeth 17 of the ring 1. The portions 15 of these pawls are of such weight that when the inner member or spider 9 revolves at moderate speed, these parts 15 will fly out and swing back the parts 16 into the recesses 13, which is the position of the pawls $14^c$ and $14^d$.

Pins 18 on the spider 9 carry the dogs $19^a$, $19^b$, $19^c$ and $19^d$ which swing out by centrifugal force when the spider 9 revolves at moderate speed, and, as soon as the pawls swing to the positions of pawls $14^c$ and $14^d$, the dogs 19 move to the positions of the members $19^c$ and $19^d$, engaging with the weight-portions 15 of the pawls. These members 14 and 19 will remain in these positions so long as the shaft 6 revolves at more than a predetermined moderate speed, and if there were no sudden reversal of the movement of the shaft, the members 19 would be unnecessary. But when internal combustion engines are running at moderate speeds, "back-firing" sometimes occurs, resulting in the instant reversal of the engine, and when engines are shut down, they often oscillate back and forth under compression before coming to a rest. This means that the engine comes to a stop and then begins to rotate in the opposite direction. If the dogs 19 were omitted, one or more of the pawls 14 might assume the position of the pawl $14^b$, and the driving member 1 would be turned in the direction opposite to the arrow 20, which might result in great damage. But at the instant of stoppage, the dogs 19 will still have their outer ends in contact with the parts 15 of the pawls 14, and, because of friction and of the oil surrounding the parts preventing sudden movement, these dogs will retain the positions $19^c$ and $19^d$ for several seconds, or until the shaft 6 has attained sufficient speed to cause the dogs 19 to keep or resume the position $19^c$.

When the shaft 6 is stationary, the pawls 14 will assume the positions shown in Fig. 1, that is, the pawls $14^a$ and $14^b$ will be held by gravity in the positions there shown with the engaging members 16 meshing with the teeth 17, while the pawls 14$^c$ and 14$^d$ will be in such position that their portions 16 will be out of engagement with these teeth 17. When the starting device is now set in motion to turn the ring 1 in the direction of the arrow 20, in Fig. 1, the pawls 14$^a$ and 14$^b$ will be carried with this ring and thereby rotate the driven member 9 and the shaft 6.

When the engine has been started, its speed will soon be greater than that of the ring 1, the pawls 16 will move faster than the ring 1, and centrifugal force will swing out the dogs 19 to the position shown at 19$^c$ and 19$^d$, when they will serve as safety devices as above described. When the shaft 6 stops turning, these members 19 may slowly turn on their pivots to the positions shown in Fig. 1.

I claim.

1. In a centrifugal clutch, the combination of a shaft, a driving member revolubly mounted thereon and having internal teeth, a driven member secured to said shaft, main pawls mounted on the driven member and adapted to engage said internal teeth, said pawls having counter-weighted portions adapted to swing the pawls out of engagement with said teeth when the shaft attains a predetermined speed, and auxiliary members pivoted on the driven member and adapted to hold the main pawls out of engagement with said teeth.

2. In a centrifugal clutch, the combination of a shaft, a pair of disks revolubly mounted on the shaft, an internally toothed ring mounted between said disks, a spider secured to the shaft between the disks, pawls pivoted to said spider and adapted to engage the internal teeth of the ring and having counterweights adapted to swing out by centrifugal force and carry the pawls out of engagement with said internal teeth when said shaft attains a predetermined speed, and auxiliary members pivoted to said spider and adapted to swing out by centrifugal force and engage the pawls to hold them out of engagement with said internal teeth of said ring.

3. In a centrifugal clutch, the combination of concentrically mounted driving and driven members, a plurality of counter-weighted members pivoted on the driven member and adapted to operatively engage the driving member until the driven member has attained a predetermined speed, and a plurality of auxiliary members pivoted on the driven member and adapted to swing out into engagement with the counter-weighted members and temporarily hold them out of engagement with the driving member.

4. In a centrifugal clutch, the combination of a spider and an internally toothed ring concentrically mounted, a plurality of pawls pivoted on the spider and adapted to engage the teeth of the ring until the spider has attained a predetermined speed, and a plurality of dogs pivoted on the spider and adapted to swing out into engagement with the pawls and to hold them out of engagement with said teeth at sudden reversals of the driven member.

5. In a centrifugal clutch, the combination of a shaft, a driving member revolubly mounted thereon and having an internal engaging surface, a driven member secured to said shaft, a pivot on the driven member, a pawl mounted to swing on the pivot, one end of the pawl being provided with an engaging surface adapted to contact with the internal engaging surface, and the other end of the pawl being of greater weight than the engaging end whereby the latter may be withdrawn from engagement with the internal engaging surface by the action of centrifugal force when the shaft attains a certain speed, a second pivot on the driven member, a third member mounted to swing upon the second pivot, and having an end adapted to swing into contact with the pawl to withhold the same from contact with the internal engaging surface.

6. In a centrifugal clutch, the combination of a shaft, a driving member revolubly mounted thereon and having an internal engaging surface, a driven member secured to said shaft, a pivot on the member, a pawl mounted to swing on the pivot, one end of the pawl being provided with an engaging surface adapted to contact with the internal engaging surface, and the other end of the pawl being of greater weight than the engaging end whereby the latter may be withdrawn from engagement with the internal engaging surface by the action of centrifugal force when the shaft attains a certain speed, a second pivot on the driven member, a third member mounted to swing freely upon the second pivot by the action of centrifugal force upon its own mass, and having an end adapted to swing into contact with the pawl to withhold the same from engagement with the internal engaging surface upon sudden reversals of the driven member.

7. In a centrifugal clutch, the combination of a shaft, a driving member revolubly mounted thereon and provided with an engaging surface, a driven member secured to said shaft, a pivot on the member, the axis of the pivot being parallel to the axis of the shaft, a second member mounted to swing on the pivot, one end of the second member being provided with an engaging surface that is adapted to contact with the engaging surface on the driving member, and the other end being of greater weight than the engaging end whereby the latter may be withdrawn from engagement with the engaging surface on the driven member through the action of centrifugal force when the shaft attains a certain speed, a second pivot on the driven member, the axis of the second pivot being parallel to the axis of the shaft, a third member mounted to swing upon the second pivot by the action of the centrifugal force of its own mass, and having an end adapted to contact with the second member to withhold the same from engagement with the engaging surface of the driving member upon sudden reversals of the driven member.

8. In a centrifugal clutch, the combination of a shaft, a pair of disks revolubly mounted on the shaft, a ring mounted between the disks, a member secured to the shaft between the disks, a pair of pivots carried by the member, the axis of each of the pivots being parallel to the axis of the shaft, a second member mounted to swing upon one of the pivots, said second member having at one end a surface that is adapted to engage with the internal surface of the ring, its opposite end being counterweighted whereby the member may be withdrawn from engagement with the ring when the shaft attains a certain speed, a third member mounted to swing upon the other pivot, said third member being provided with a portion that is adapted to engage with the second member and withhold the same from engagement with the internal surface of the ring upon sudden reversals of the driven member, and a liquid filling the interstices between the disks, ring and shaft.

In testimony whereof I have signed this specification in the presence of two subscribing witnesses.

SIMON DEUTSCH.

Witnesses:
  EDWARD N. PAGELSEN,
  HUGO W. KREINBRING.